United States Patent [19]

Appel et al.

[11] 4,290,313

[45] Sep. 22, 1981

[54] ELECTROMAGNETIC FLOWMETER SYSTEM

[75] Inventors: Eggert Appel, Dransfeld; Peter Nissen, Rosdorf; Gottfried Geisler, Goettingen; Wilfried Kiene, Hann-Muenden, all of Fed. Rep. of Germany

[73] Assignee: Fischer & Porter Company, Warminster, Pa.

[21] Appl. No.: 112,344

[22] Filed: Jan. 15, 1980

[51] Int. Cl.³ .................................................. G01F 1/60
[52] U.S. Cl. ................................................. 73/861.17
[58] Field of Search ........................... 73/861.16, 861.17

[56] References Cited

U.S. PATENT DOCUMENTS

| | | | |
|---|---|---|---|
| 3,550,446 | 12/1970 | Tucker et al. | 73/861.17 |
| 3,759,097 | 9/1973 | Cushing | 73/861.17 X |
| 3,999,443 | 12/1976 | Appel et al. | 73/861.17 |
| 4,050,301 | 9/1977 | Cushing | 73/861.17 X |

*Primary Examiner*—Charles A. Ruehl
*Attorney, Agent, or Firm*—Michael Ebert

[57] ABSTRACT

An electromagnetic flowmeter system whose electromagnets are excited by a direct-current source through switching means operating at a predetermined drive frequency to generate a pulsatory current establishing a magnetic flux field in the flow tube through which the fluid to be measured is conducted. The fluid intercepting this field induces a pulsatory voltage in the metering electrodes mounted at diametrically-opposed positions on the tube. The electrode voltage is applied to an analyzer which includes a sampling switch operating in synchronism with the drive frequency to extract pulses from the electrode voltage during the magnetic flux steady state intervals thereof. These pulses, which are rich in harmonics, are fed through a filter that selects one of the harmonics to yield a harmonic signal which is demodulated to produce an output signal free of disturbances.

9 Claims, 7 Drawing Figures

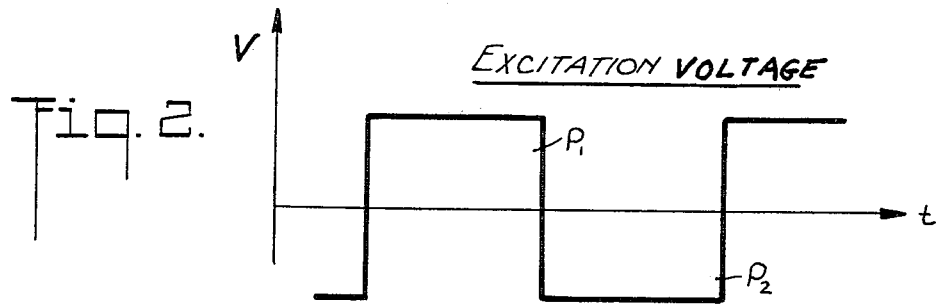
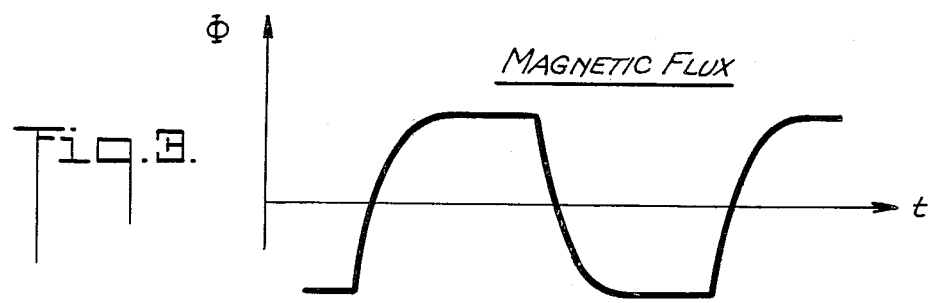
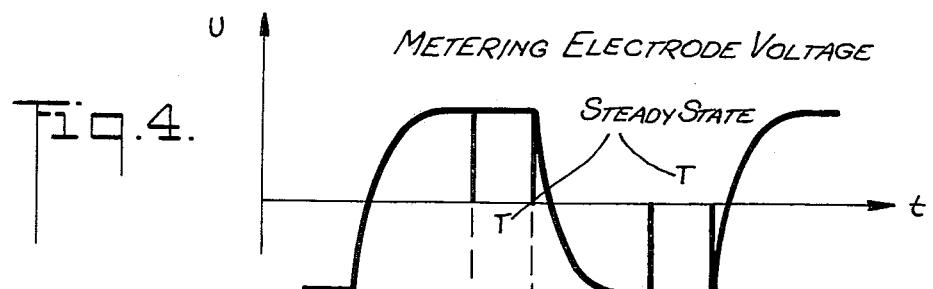
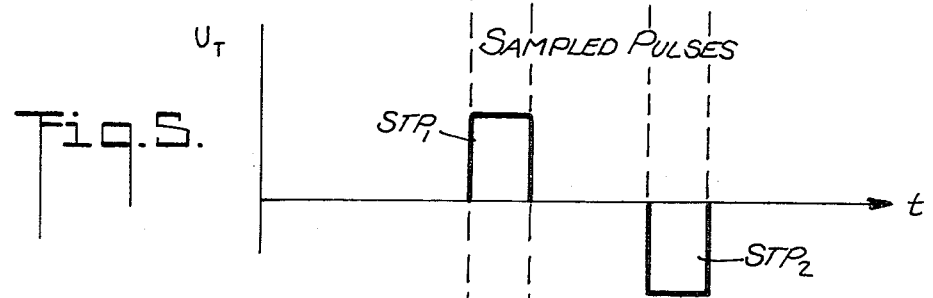
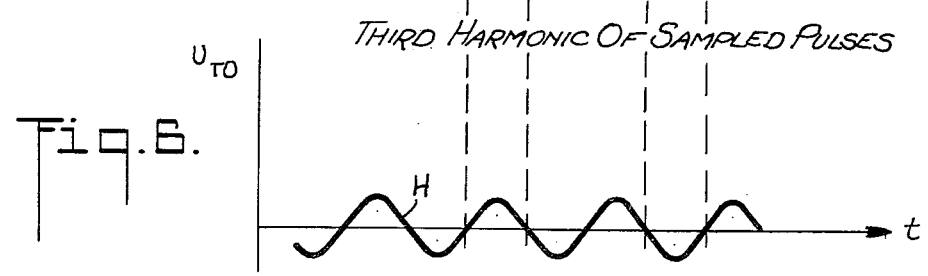

ELECTROMAGNETIC FLOWMETER SYSTEM

BACKGROUND OF INVENTION

This invention relates generally to electromagnetic flowmeter systems whose electromagnets are excited by a pulsatory current to produce an output signal indicative of flow rate, and more particularly to a system in which the voltage induced in the metering electrodes is sampled during magnetic flux steady-state intervals to produce periodic pulses, a harmonic of which is extracted and rectified to yield a noise-free output signal.

In a conventional electromagnetic flowmeter, the fluid whose flow rate is to be measured is conducted through a flow tube provided with a pair of diametrically-opposed electrodes, a magnetic field perpendicular to the longitudinal axis of the tube being established by electromagnets. When the fluid intersects this field, a voltage is induced therein which is transferred to the electrodes. This voltage, which is proportional to the average velocity of the fluid and hence to its average volumetric rate, is then amplified and processed to yield an output signal for actuating a recorder or indicator, or for carrying out various process control operations.

The magnetic field may be either direct or alternating in nature; for in either event the amplitude of voltage induced in the liquid passing through the field will be a function of its flow rate. But when operating with direct magnetic flux, the D-C signal current flowing through the liquid acts to polarize the electrodes, the magnitude of polarization being proportional to the time integral of the polarization current. With alternating magnetic flux operation, polarization is rendered negligible; for the resultant signal current is alternating and therefore its integral does not build up with time.

Though A-C operation is clearly advantageous in that polarization is obviated and the A-C flow-induced signal may be easily amplified, it has distinct drawbacks. The use of an alternating flux introduces spurious voltages that are unrelated to flow rate and, if untreated, give rise to inaccurate indications. The two most-troublesome spurious voltages are stray capacitance-coupled voltages from the coils of the electromagnets to the electrodes, and induced loop voltages in the input leads. The electrodes and leads in combination with the liquid extending therebetween constitute a loop in which a voltage is induced from the changing flux of the magnetic coils.

The spurious voltages from the first source may be minimized by electrostatic shielding and by low-frequency excitation to cause the impedance of the stray coupling capacitance to be large. But the spurious voltage from the second source is much more difficult to suppress.

The spurious voltage resulting from the flux coupling into the signal leads is usually referred to as the quadrature voltage, for it is assumed to be 90° out of phase with the A-C flow-induced voltage. Actual tests have indicated that this is not true in that a component exists in-phase with the flow induced voltage. Hence, that portion of the "quadrature voltage" that is in-phase with the flow-induced voltage signal constitutes an undesirable signal that cannot readily be distinguished from the flow-induced signal, thereby producing a changing zero shift effect.

Pure "quadrature" voltage has heretofore been minimized by an electronic arrangement adapted to buck out this component, but elimination of its in-phase component has not been successful. Existing A-C operated electromagnetic flowmeters are also known to vary their calibration as a function of temperature, fluid conductivity, pressure and other effects which can alter the spurious voltages both with respect to phase and magnitude. Hence it becomes necessary periodically to manually re-zero the meter to correct for the effects on zero by the above-described phenomena.

All of the adverse effects encountered in A-C operation of electromagnetic flowmeters can be attributed to the rate of change in the flux field $(d\phi)/dt$, this change serving to induce unwanted signals in the pick-up loop. If, therefore, the rate of change of the flux field could be reduced to zero value, then the magnitude of quadrature and of its in-phase component would become non-existent and zero drift effects would disappear.

When the magnetic flux is a steady state field, as, for example, with continuous d-c operation, the ideal condition $d\phi/dt = 0$ is satisfied. But d-c operation to create a steady state field is not acceptable, for galvanic potentials are produced and polarization is encountered, as previously explained. In order, therefore, to obtain the positive benefits of a steady state field without the drawbacks which accompany continuous d-c operation, U.S. Pat. No. 3,783,687 to Mannherz et al. discloses an excitation arrangement in which the steady-state flux field is periodically reversed or interrupted.

In the Mannherz et al. patent, in order to avoid the spurious voltages which result from stray couplings without, however, causing polarization of the electrodes, the electromagnet is energized by a low-frequency square wave. This wave is produced by applying the output voltage of an unfiltered full-wave rectifier to the electromagnet and periodically reversing the voltage polarity at a low-frequency rate by means of an electronic switch.

Since the steady-state field produced by the square wave is disrupted by switching transients occurring at the points of reversal, the converter to which the signal from the electrodes is applied includes a demodulator which is gated synchronously with the electronic switch to yield an output signal only when the magnetic flux achieves a steady state condition.

Similarly, in the Hognestat U.S. Pat. No. 3,329,018, the voltage induced in the electrodes of a flowmeter excited by square wave pulses is applied through a gating circuit to an amplifier, the gating circuit passing this voltage to the amplifier only during intervals when the magnetic field is constant. In the Tucker et al. U.S. Pat. No. 3,550,446, applied to the electromagnets of a magnetic flowmeter is a direct-current which is periodically switched to cause the magnetic field to alternate in opposite directions, the voltage induced in the electrodes being sampled during each switching period after a predetermined delay to allow transients to die away, so that the voltage in the sampled intervals represent a steady-state condition. The difference between successive samples is determined to provide an indication of fluid flow rate that is independent of disturbances. The disclosures of U.S. Pat. Nos. 3,783,687; 3,329,018 and 3,550,446 are incorporated herein by reference.

Though electromagnetic flowmeter systems of the tape disclosed in the above-identified patents analyze the periodic voltage induced in the metering electrodes only during steady-state magnetic flux intervals and therefore have advantages over systems which operate with a sinusoidal magnetic flux pattern and do not discriminate against disturbances, these prior art systems still have certain drawbacks.

During the steady state intervals when $d\phi/dt=0$, polarization potentials are built up at the metering electrodes which give rise to disturbances. When such disturbances take the form of long term variations in voltage, they can be compensated for by known circuit arrangements.

The starting point for the present invention is the existence of short term as well as long term variations by reason of polarization potentials built up at the metering electrodes of a flowmeter system excited by a pulsatory current. The frequency spectrum of these short term disturbances usually extend up to approximately 10 m/sec. within a range up to about 20 Hz.

The obvious way to overcome such short term disturbances is to provide a magnetic flux $\phi$ with a periodicity lying within a range that is above 20 Hz. But then the $d\phi/dt=0$ sampled intervals will also be short, and this will give rise to disturbances comparable to those encountered when using a sinusoidal magnetic flux pattern.

SUMMARY OF INVENTION

In view of the foregoing, the main object of this invention is to provide an electromagnetic flowmeter system whose electromagnets are excited by a pulsatory current and the periodic voltage induced in the metering electrodes is sampled during steady state magnetic flux intervals to produce an output signal that accurately reflects flow rate and is free from disturbances resulting from short term variations or transients.

More particularly, an object of this invention is to provide a system of the above type in which periodic sampling of the voltage induced in the metering electrodes in synchronism with the pulsatory rate of the excitation current produces a train of steady state pulses having a repetition rate that corresponds to the frequency of the excitation current from which an integral harmonic is extracted to produce a harmonic signal that is demodulated to yield a disturbance-free output signal.

Also an object of this invention is to provide a relatively simple, low-cost flowmeter system of the above-noted type which operates reliably and efficiently and affords accurate readings of flow rate.

Briefly stated, these objects are attained in a flowmeter system whose electromagnets are excited by a direct-current source through switching means operating at a predetermined drive frequency to produce a pulsatory current establishing a magnetic field in the flow tube through which the fluid to be measured is conducted, the fluid intercepting this field to induce a pulsatory voltage in the metering electrodes mounted at diametrically-opposed positions in the tube.

The metering electrode voltage is applied to an analyzer which includes a sampling switch operating in synchronism with the drive frequency to extract pulses during the magnetic flux steady state intervals of the electrode voltage. These pulses, which are rich in harmonics, are applied to a filter which selects one of the harmonics to provide a harmonic signal which is demodulated to yield an output signal free of disturbances.

OUTLINE OF DRAWINGS

For a better understanding of the invention as well as other objects and further features thereof, reference is made to the following detailed description to be read in conjunction with the accompanying drawings, wherein.

FIG. 3 graphically illustrates the pattern of magnetic flux resulting from the excitation current;

FIG. 4 illustrates the waveform of voltage induced in the electrodes of the flowmeter;

FIG. 5 shows the periodic pulses extracted by sampling the metering electrode voltages;

FIG. 6 shows the third harmonic of the periodic pulses; and

FIG. 7 is a block diagram of a system in accordance with the invention.

DESCRIPTION OF INVENTION

Figure 1:
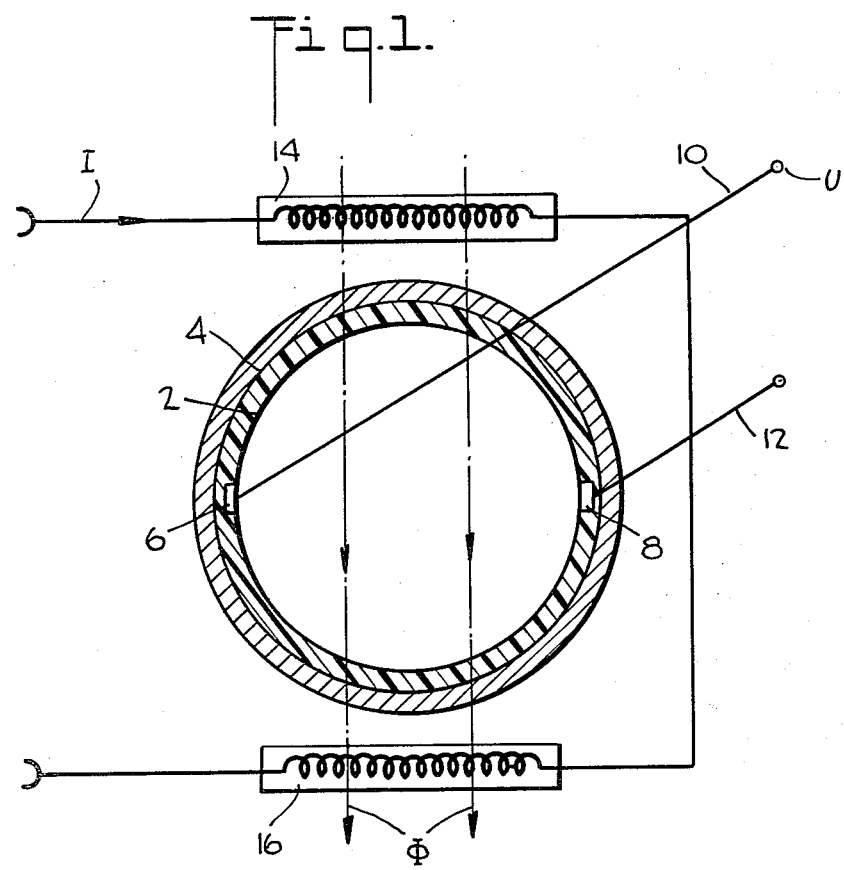
FIG. 1 is a transverse cross section taken through the flow tube of an electromagnetic flowmeter of the type used in a system in accordance with the invention.

Basic Principles:

Referring now to FIG. 1, there is schematically shown an electromagnetic flowmeter of the type used in a system in accordance with the invention, the flowmeter including a flow tube 4 through which the fluid to be metered is conducted. Flow tube 4 is provided with an insulation liner 2 and a pair of diametrically-opposed metering electrodes 6 and 8 whose faces are in contact with the fluid passing through the tube.

Metering electrodes 6 and 8 are connected through lines 10 and 12 to an analyzer in accordance with the invention, to be later described in conjunction with FIG. 7. Also provided is a pair of electromagnets 14 and 16 positioned on opposite sides of the flow tube. The electromagnets are connected in series to an excitation source to cause an excitation current I to flow therethrough which establishes magnetic flux $\phi$ in a plane at right angles both to the transverse axis extending between the electrodes and to the longitudinal flow axis of the tube.

Current I takes the form of a pulsatory wave whose d-c pulses are all of the same polarity or of alternate polarity. As a consequence, magnetic flux is developed in successive half cycles in the same or in opposite directions, assuming for this purpose that a half cycle is associated with each pulse in the pulsatory excitation wave. Thus in the course of each half cycle, there is an interval in which $d\phi/dt=0$; that is, a magnetic flux steady-state interval.

In each of the above-identified prior art patents, there is a switching or gating arrangement adapted to connect the metering electrodes to an analyzer only during sampling periods corresponding to these steady state intervals, thereby avoiding the adverse effects usually encountered in a-c operation.

In an arrangement in accordance with the invention, it is not the pulses derived by sampling the metering electrode voltage that is analyzed, but a selected harmonic of these pulses whose frequency is an integral multiple of the pulse repetition rate or fundamental frequency. This harmonic signal is independent of short term variations in the metering electrode voltage and is therefore unaffected by these disturbances.

Best results are obtained when the duration of the sampling period is made equal to an integral fraction of the magnetic flux period. The results are also more favorable when the duration of a half cycle of the selected harmonic signal is equal to the duration of a sampling period.

Figure 2:
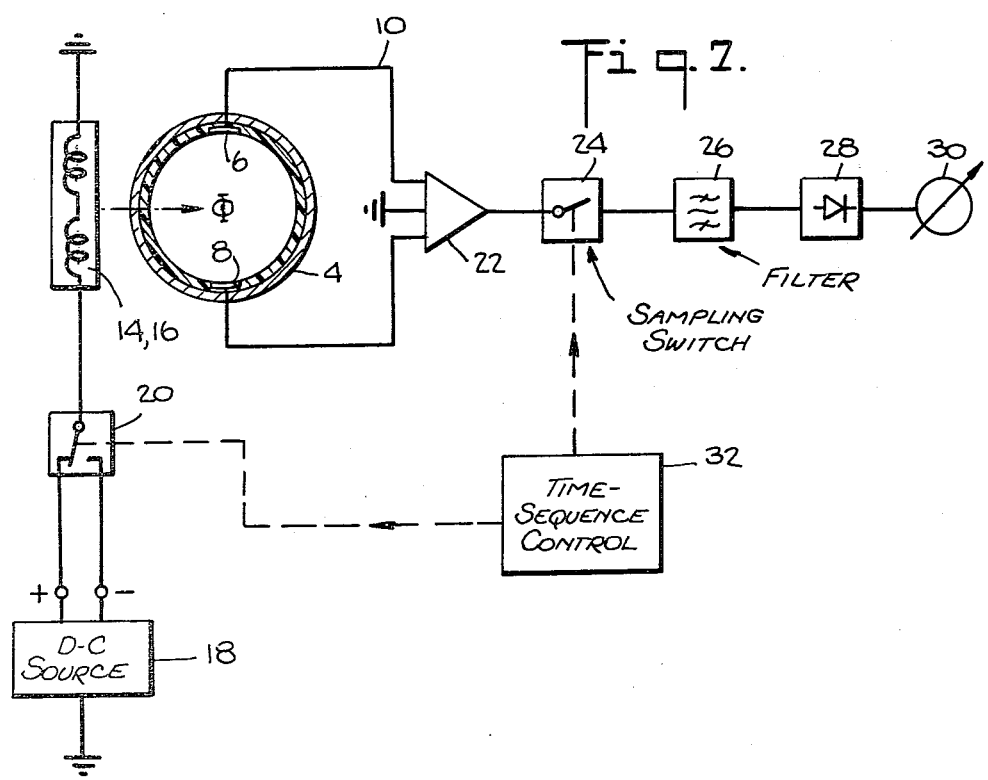
FIG. 2 shows the pulsatory wave form of the excitation voltage for the flowmeter electromagnets.

Wave Forms:

FIG. 2 shows a preferred form of the pulsatory excitation voltage V for electromagnets 14 and 16 plotted against time, the figure illustrating two successive voltage pulses $P_1$ and $P_2$ of opposite polarity. These voltage pulses give rise to a magnetic flux $\phi$ whose pattern is shown in FIG. 3. It will be seen that during the period of positive pulse $P_1$, flux $\phi$ first increases in intensity along a rising curve until it attains a maximum level which remains in a steady state until a point is reached coincident with the trailing edge of this pulse, at which point the flux intensity falls along a declining curve. This is followed by a like flux pattern in the reverse direction in the period of negative pulse $P_2$.

FIG. 4 shows metering electrode voltage U plotted against time, the sampling periods T therein corresponding to the steady state intervals in the magnetic flux pattern shown in FIG. 3. It is only the magnetic flux steady-state pulses $STP_1$ and $STP_2$ of opposite polarity, as shown in FIG. 5, which are subject to analysis. The periodicity of repetition rate of pulses $STP_1$ etc. corresponds to the drive frequency of the excitation current. But it is not this frequency which is analyzed but a frequency which is a harmonic thereof, as shown in FIG. 6, by wave H whose magnitude $U_T$ is plotted against time.

It will be evident from FIG. 6 that harmonic signal H is the third harmonic of the frequency of the sampled pulses $STP_1$ etc., and that the duration of the half cycles of this harmonic are the same as the duration of the sampled pulses.

By a technique first disclosed by Fourier, any periodic wave form can be analyzed into or can be synthesized from a series of sinusoidal or harmonic functions. The frequencies of the terms in the series are integral multiples of some fundamental frequency and the amplitudes and phases of the harmonic component are uniquely related to a given wave form.

In a Fourier analysis of a rectangular wave form, such as that shown in FIG. 5, the resultant amplitude-frequency plot with the frequency scale expressed in terms of multiples of the fundamental indicates that the 3rd, 5th, 7th, 9th, 11th etc. harmonic components are of progressively diminishing amplitude, the series converging to a finite limit. In the present system, since the 3rd harmonic has the highest amplitude and is easily derived from the fundamental, use is preferably made thereof.

The System:

In a system in accordance with the invention as shown in FIG. 7, the flowmeter structure is the same as that shown in FIG. 1. Serially-connected electromagnetic coils 14 and 16 are connected through a changeover switch 20 to a direct-current source 18. Switch 20 is driven by a time-sequence control device 32 at a predetermined rate. Switch 20 acts to alternately connect the positive and negative terminals of the d-c source to the electromagnets to generate an excitation current I as shown in FIG. 1, resulting in a magnetic flux whose direction periodically reverses as shown in FIG. 2. The system is also applicable to a non-reversing switching arrangement, in which case the periodically established field is always in the same direction.

Metering electrodes 6 and 8 are connected through lines 10 and 12 to the input of amplifier 22 which is balanced to ground. Amplifier 22, which is the first stage in the analyzer coupled to the flowmeter, acts to amplify the voltage induced in the metering electrodes and to apply this metering electrode voltage to a sampling switch 24.

Switch 24 is driven by time-sequence control device 32 to extract pulses from the metering electrode voltage during sampling intervals T, as shown in FIG. 4, thereby producing a train of steady-state pulses $STP_1$, $STP_2$ etc. as shown in FIG. 5. These pulses are applied to a narrow band pass filter 26. The sampling pulses which are rich in harmonics are fed through this filter which is tuned to select the third harmonic therefrom. The resultant harmonic signal which is shown in FIG. 6 is applied to a rectifier or demodulator 28 to produce an output signal that is free of disturbances. This signal is applied to indicator 30 to afford an accurate reading of flow rate.

While there has been shown and described a preferred embodiment of an electromagnetic flowmeter system in accordance with the invention, it will be appreciated that many changes and modifications may be made therein without, however, departing from the essential spirit thereof.

I claim:

1. An electromagnetic flowmeter system including a flowmeter having electromagnets associated with a flow tube through which the fluid to be measured is conducted, the fluid intercepting a magnetic field established by the electromagnets to induce a voltage as a function of flow rate in a pair of metering electrodes mounted at opposed positions on the tube, said electromagnets being excited by a pulsatory current in accordance with a predetermined drive frequency to produce periodic magnetic flux fields resulting in a periodic metering electrode voltage, and an analyzer responsive to said metering electrode voltage to generate an output signal that is proportional to the flow rate of the fluid and is free from disturbances, said analyzer comprising:

A a sampling switch operating in synchronism with said drive frequency during sampling periods which extract from said metering electrode voltage the magnetic flux steady-state intervals thereof to produce an output train of rectangular pulses which are rich in harmonics; and B means coupled to the output of said sampling switch to select an odd harmonic from said pulses to produce a harmonic signal which is demodulated to yield said output signal free from disturbances.

2. A flowmeter system as set forth in claim 1, wherein the selected harmonic is the third harmonic.

3. A flowmeter system as set forth in claim 1, wherein said means are constituted by a selective filter whose output is applied to a rectifier.

4. A flowmeter system as set forth in claim 3, wherein the output of the rectifier is the output signal which is applied to a flow rate indicator.

5. A flowmeter system as set forth in claim 1, wherein said excitation current is produced by a d-c source coupled through a changeover switch to said electromagnets, said switch being driven by a time sequence control circuit at said predetermined frequency, which circuit also controls said sampling switch.

6. A flowmeter system as set forth in claim 1, wherein the duration of a sampling period is equal to an integral fraction of the duration of a magnetic flux period.

7. A flowmeter as set forth in claim 1, wherein the duration of a half cycle of said harmonic signal is equal to the duration of said sampling period.

8. A flowmeter system as set forth in claim 1, wherein the polarity of said excitation current produces a magnetic flux whose direction is the same in successive half cycles of each period.

9. A flowmeter system as set forth in claim 1, wherein the polarity of said excitation current produces a magnetic flux whose direction reverses in successive half cycles of each period.

* * * * *